(12) United States Patent
Yamanaka et al.

(10) Patent No.: US 8,107,352 B1
(45) Date of Patent: Jan. 31, 2012

(54) MICROWAVE ASSISTED MAGNETIC HEAD

(75) Inventors: Noboru Yamanaka, Tokyo (JP); Takuya Adachi, Tokyo (JP); Isamu Sato, Tokyo (JP); Hiroshi Ikeda, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/852,775

(22) Filed: Aug. 9, 2010

(51) Int. Cl.
*G11B 7/00* (2006.01)
*G11B 5/147* (2006.01)

(52) U.S. Cl. ............ 369/112.27; 360/125.02

(58) Field of Classification Search .......... 369/13.33, 369/13.13, 13.24, 13.32, 13.03, 112.27, 112.09; 360/125.02, 125.31, 125.74, 123.11, 123.17, 360/126

See application file for complete search history.

(56) References Cited

U.S. PATENT DOCUMENTS

| | | | |
|---|---|---|---|
| 7,791,838 B2 * | 9/2010 | Sato et al. | 360/125.02 |
| 2003/0039068 A1 | 2/2003 | Crawford et al. | |
| 2007/0253106 A1 | 11/2007 | Sato et al. | |
| 2009/0080120 A1 | 3/2009 | Funayama et al. | |
| 2009/0316304 A1 | 12/2009 | Funayama et al. | |

FOREIGN PATENT DOCUMENTS

| JP | A-2007-299460 | 11/2007 |
|---|---|---|
| JP | A-2009-080869 | 4/2009 |

OTHER PUBLICATIONS

J. Zhu, et al., "Microwave Assisted Magnetic Recording," *IEEE Transaction on Magnetics*, vol. 44, No. 1, pp. 125-131 (2008) (Discussed on p. 3 of the Specification).

* cited by examiner

*Primary Examiner* — Ali Neyzari
(74) *Attorney, Agent, or Firm* — Posz Law Group, PLC

(57) ABSTRACT

A microwave assisted magnetic head is formed to include a main pole magnetic layer including a main pole; a shielded magnetic layer including a shielded pole; a recording coil that is formed to generate a writing magnetic field from a tip of the main pole; and a microwave radiation waveguide made of a conductive nonmagnetic material that is disposed in a recording gap, the recording gap being a gap between the main pole and the shielded pole. The main pole magnetic layer and the shielded magnetic layer have an intermediate connection part that connects the layers at a depth-side, and an electrical insulation magnetic film is disposed in the intermediate connection part, and the main pole and the shielded pole are electrically connected with the microwave radiation waveguide that is disposed in the recording gap, which is the gap between the main pole and the shielded pole so that a simple configuration, with a relatively easy and efficient manufacturing process, is realized that overlaps AC magnetic fields in an in-plane direction of a microwave band, which is the same as, or close to, a ferromagnetic resonant frequency of a medium recording layer.

12 Claims, 14 Drawing Sheets

FIG.2
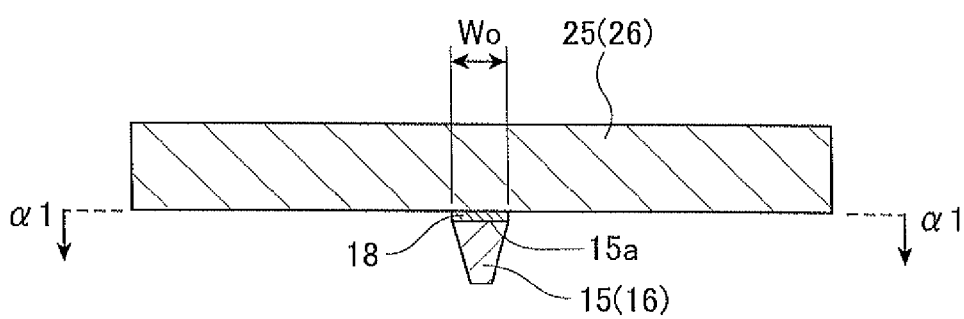
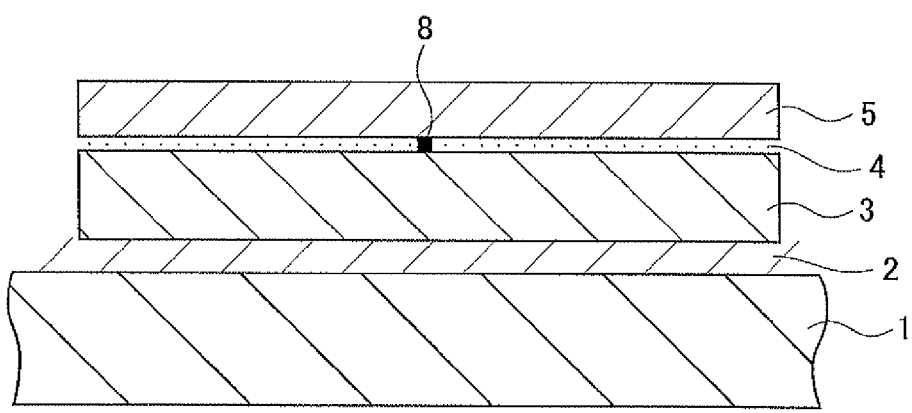
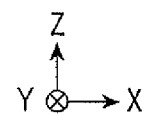

FIG.7
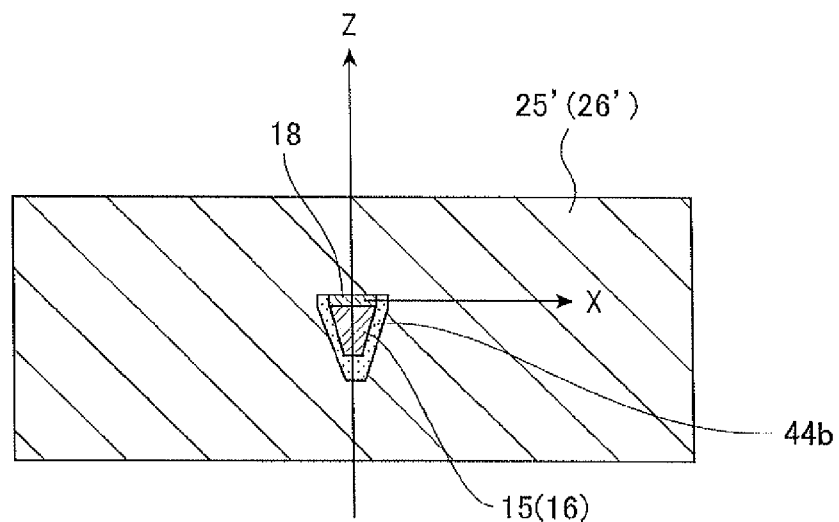
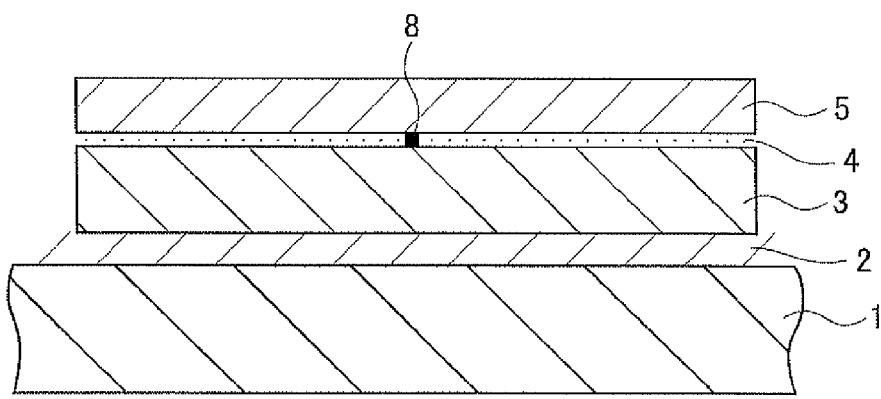
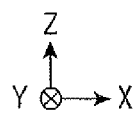

MICROWAVE ASSISTED MAGNETIC HEAD

BACKGROUND

1. Field of the Invention

The present invention relates to microwave assisted magnetic heads and magnetic disk devices providing a microwave radiation waveguide, which generate an alternating current (AC) magnetic field of a microwave band, to assist in writing data signals on magnetic recording media having a large coercive force to stabilize the magnetization.

2. Description of Conventional Art

In association with an advance of high density recording, bit cells for recording digital information on magnetic recording media are miniaturized. As a result, since signals detected by a reproducing element of a magnetic head fluctuate due to so-called thermal fluctuation, a signal-noise ratio (S/N) may be deteriorated or the signal may be lost in the worst case.

For a magnetic recording medium of a perpendicular recording system, which is utilized in practice in recent years, an increase in perpendicular magnetic anisotropy energy Ku of a recording film is effective to solve the above-described problem. A stability thermal stability coefficient that corresponds to the thermal fluctuation is given by Ku·V/kB·T. Herein, Ku is perpendicular magnetic anisotropy energy, V is a volume of one magnetic microparticle, kB is the Boltzmann constant, and T is the absolute temperature.

According to the so-called Stoner-Wohlfarth model, anisotropy energy Hk and coercive force He of the recording film are indicated by a formula below. In accordance with the increase in Ku, the coercive force He also increases (additionally, Hk>Hc for normal recording films).

$$Hk=Hc=2Ku/Ms$$

Herein, Ms is a saturation magnetization of the recording film.

For a reversal of magnetization of the recording film corresponding to a desired data sequence, it is necessary to apply a recording magnetic field that is steep and approximately around Hk at maximum. For magnetic disk devices (or hard disk drive, HDD), which are utilized in practice in recent years because of the perpendicular recording system, a recording element with a so-called single magnetic pole is utilized. A recording magnetic field is applied, which is perpendicular to a recording film from a surface of an air bearing surface (ABS).

An intensity of a perpendicular recording magnetic field is proportional to a saturation magnetic flux density Bs of a soft magnetic material forming the single magnetic pole. Therefore, materials having a saturation magnetic flux density Bs as high as possible are developed and utilized in practice.

However, according to the so-called Slater-Pauling curve, Bs-2.4 T (tesla) is a limit of the saturation magnetic flux density Bs for practical use, and currently it is approaching the limit for practical use.

A thickness and/or a width of a current single magnetic pole is approximately 100-200 nm. In order to increase a recording density, further reduction of the thickness and/or width is required, and the perpendicular magnetic field generated with such a minute magnetic pole tends to be reduced.

For these reasons, it can be said that the recording ability of the ordinary data writing element is approaching the limit, and that difficulties are faced to achieve the high density recording.

Therefore, a so-called thermal assisted magnetic recording (TAMR) has been proposed. With the TAMR, the recording film is irradiated with laser light etc., the temperature of the recording film is increased, and signals are recorded in a situation where the coercive force of the recording film is lowered.

However, there are the following problems even for the TAMR. (1) A magnetic head providing a magnetic element and an optical element is required so that the configuration thereof is extremely complex and expensive. (2) It is required to develop a recording film which has a coercive force with a highly sensitive temperature characteristic. (3) Due to a thermal demagnetization during a recording process, adjacent track erasures may occur and/or a recording condition becomes unstable.

On the other hand, in order to largely reduce perpendicular recording magnetic fields that are necessary for magnetization reversal, it is considered to overlap AC magnetic fields in an in-plane direction with a microwave band on a perpendicular recording magnetic field generated from a tip of a main pole for exciting the magnetization reversal. The AC magnetic fields are the same as, or close to, a ferromagnetic resonant frequency of a medium recording layer. Such an assisted recording method is referred to as microwave assisted magnetic recording (MAMR), and its efficiencies are experimentally verified.

With respect to the MAMR, two methods have been mainly proposed. One is a method that generates a microwave magnetic field in the in-plane direction by forming a spin torque oscillator (STO) formed of a multilayered magnetic thin film in a gap (write gap) between a main pole (or write pole) of the magnetic head and an auxiliary magnetic pole that is a write shield, and by driving a bias electric current to oscillate the STO, as discussed in Reference 1 (J. Zhu et al.; IEEE Transaction on Magnetics, Vol. 44, No. 1, p. 125) (this may be called a STO type).

The other is a method that generates an in-plane AC magnetic field by providing a secondary coil in, or adjacent to, the write gap between the main pole and the auxiliary magnetic pole of the magnetic head and by driving an AC of a microwave band to the secondary coil, as discussed in Reference 2 (JP Patent Laid-open Publication 2007-299460) (this may be called a coplanar waveguide (CPW) type).

The STO type has a complex process because an STO element configured of multilayered films is embedded in the write gap that is in a scale of approximately 30 nm, and an oscillation frequency and power of the type has a limit due to a configuration of the STO element and an applied bias. Therefore, it is assumed that the STO type lacks versatility for all types of the perpendicular magnetic recording medium.

With the above described CPW type, which is different from the STO type, its frequency and power are arbitrarily set by a high frequency oscillation source mounted outside. However, it is required to form a coil conductor in the write gap and to embed a periphery thereof with insulators, so that there are structural and dimensional limitations and the process is complex.

The present invention is conceived corresponding to the current situation. One of objectives of the present invention is to provide a microwave assisted magnetic head that has a novel configuration, having a simple configuration, with a relatively easy and efficient manufacturing process, and that overlaps AC magnetic fields in an in-plane direction of a microwave band, which is the same as, or close to, a ferromagnetic resonant frequency of a medium recording layer.

SUMMARY

In order to solve the above problems, a microwave assisted magnetic head of the present application includes a main pole magnetic layer including a main pole; a shielded magnetic layer including a shielded pole; a recording coil that is formed to generate a writing magnetic field from a tip of the main pole; and a microwave radiation waveguide made of a conductive nonmagnetic material that is disposed in a recording gap, the recording gap being a gap between the main pole and the shielded pole, wherein the main pole magnetic layer and the shielded magnetic layer have an intermediate connection part that connects the layers at a depth-side, and an electrical insulation magnetic film is disposed in the intermediate connection part, and the main pole and the shielded pole are electrically connected with the microwave radiation waveguide that is disposed in the recording gap, which is the gap between the main pole and the shielded pole.

In a preferred embodiment of the present invention, a microwave oscillator is connected to an electric circuit that is formed by the main pole magnetic layer, the microwave radiation waveguide, and the shielded magnetic layer, and the connected microwave oscillator is configured to radiate a microwave band resonant magnetic field having either a ferromagnetic resonant frequency or an adjacent frequency of a magnetic recording medium, which is subjected to recording, by applying a microwave exciting current.

In a preferred embodiment of the present invention, a microwave oscillator is connected to an electric circuit that is formed by the main pole magnetic layer, the microwave radiation waveguide, and the shielded magnetic layer, and the connected microwave oscillator is configured to generate a current by applying a microwave exciting current, and to make the current flow in a direction perpendicular to a film surface of the waveguide.

In a preferred embodiment of the present invention, the microwave radiation waveguide is made of Ru, Ti, or Ta.

In a preferred embodiment of the present invention, the recording gap, which is the gap between the main pole and the shielded pole, is configured with a gap formed between an edge of the main pole at a trailing side and the shielded pole.

In a preferred embodiment of the present invention, the electrical insulation magnetic film is ferrite formed of ferromagnetic oxide.

In a preferred embodiment of the present invention, the microwave oscillator includes an integrated circuit (IC) or a microwave oscillation element supplying the microwave exciting current.

In a preferred embodiment of the present invention, the shielded magnetic layer is a non-wrap-around shield type with which only the shielded pole is provided, the shielded pole being positioned facing the main pole when seen from an air bearing surface (ABS), which is a surface facing the magnetic recording medium.

In a preferred embodiment of the present invention, the shielded magnetic layer is a wrap-around shield type that is formed as a comprehensive shielded pole surrounding the main pole via a partially formed nonmagnetic part when seen from the ABS, which is a surface facing the magnetic recording medium.

In a preferred embodiment of the present invention, the recording gap, which is the gap between the main pole and the shielded pole, includes an inclined part of which an inclining angle θ is 20-40° toward the depth-side from the ABS when seen in a vertical cross section, and the microwave radiation waveguide is disposed along the inclined recording gap.

A head gimbal assembly of the present invention includes a slider that includes the thin film magnetic head and that is positioned facing a recording medium; and a suspension that elastically supports the slider.

A magnetic disk device of the present invention includes the slider that includes the thin film magnetic head and that is positioned facing a recording medium; and a positioning device that supports and positions the slider with respect to the recording device.

BRIEF DESCRIPTION OF DRAWINGS

FIG. 1 is a cross-sectional drawing (Y-Z cross-sectional drawing) illustrating a cross section that is perpendicular to an air bearing surface (ABS) and a substrate of the thin film magnetic head, and further illustrating a magnetic recording medium that is subjected to recording.

FIG. 2 is a view seen from an arrow of β1-β1 of FIG. 1, and is the view of the ABS of the microwave assisted magnetic head according to one preferred embodiment of the present invention.

FIG. 3A corresponds to a view seen from an arrow of α1-α1 of FIG. 2.

FIG. 3B corresponds to the view seen from the arrow of α1-α1 of FIG. 2.

FIG. 3C corresponds to the view seen from the arrow of α1-α1 of FIG. 2.

FIG. 5A corresponds to the view seen from the arrow of α2-α2 of FIG. 4.

FIG. 5B corresponds to the view seen from the arrow of α2-α2 of FIG. 4.

FIG. 6 is a cross-sectional view (Y-Z cross-sectional view) illustrating a cross section perpendicular to the ABS and the substrate of the thin film magnetic head, and further illustrating the magnetic recording medium that is subjected to recording.

FIG. 7 is a view seen from an arrow β2-β2 of FIG. 6 and illustrates the ABS of the microwave assisted magnetic head according to one preferable embodiment of the present invention.

FIG. 8A illustrates especially a position of the microwave radiation waveguide between the main pole and the shielded pole (the wrap-around shield type) and the ABS of the microwave assisted magnetic head.

FIG. 8B illustrates especially the position of the microwave radiation waveguide between the main pole and the shielded pole (the wrap-around shield type), and is a view of the ABS of the microwave assisted magnetic head.

DETAILED DESCRIPTION OF EMBODIMENTS

Figure 1:
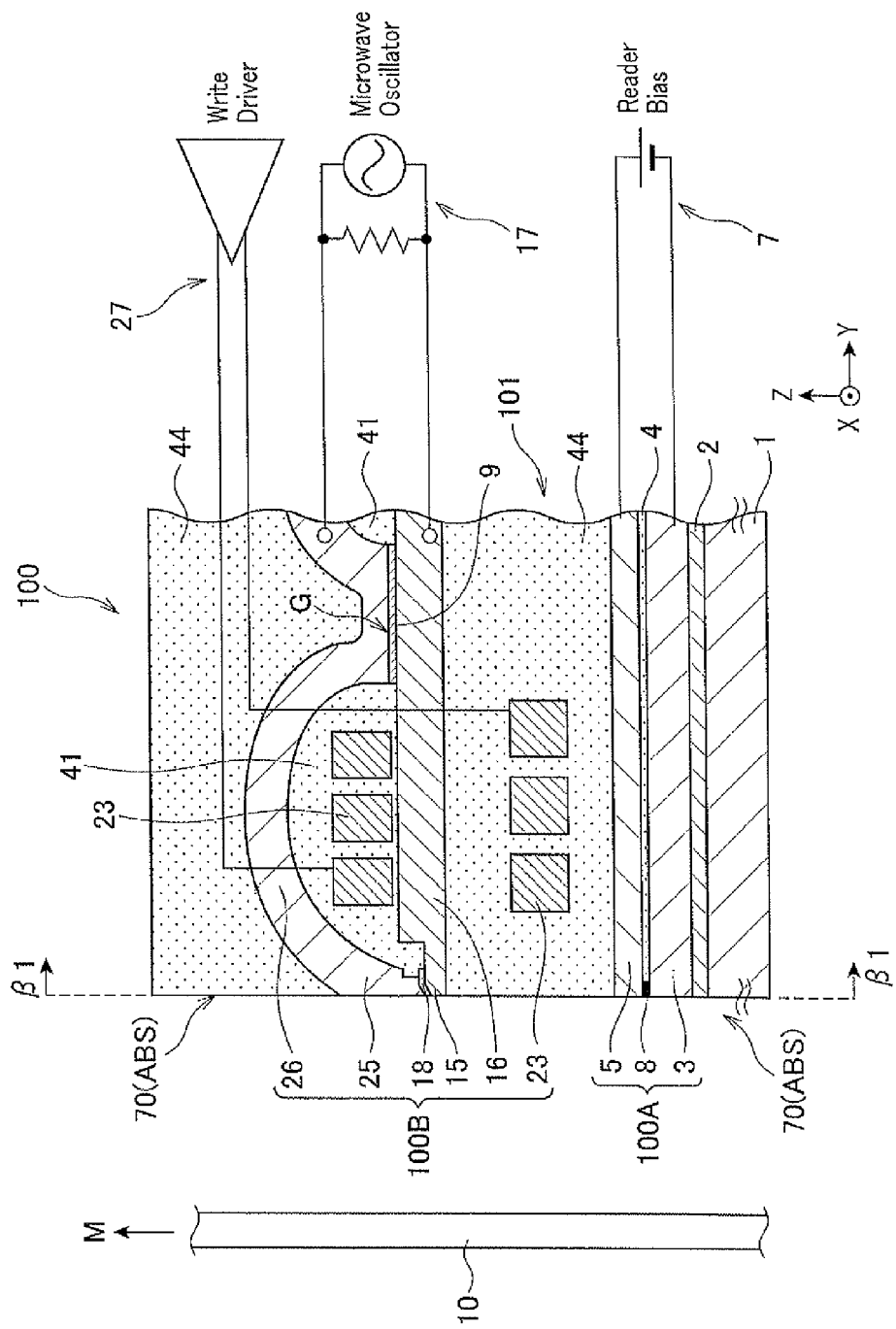
FIG. 1 illustrates a configuration of a microwave assisted magnetic head (thin film magnetic head) according to one preferred embodiment of the present invention.

Hereafter, preferred embodiments to execute the present invention will be explained in detail referring to the attached drawings. In each drawing, elements which are configured the same are indicated with the same reference numbers. Dimensions of configuring elements and positional relationships between the configuring elements are not always illustrated precisely but illustrated arbitrarily to make the drawings more easily understood.

An X-direction illustrated in the drawings corresponds to a track width direction, and a size in the X-direction may be referred to as "a width."

A Y-direction illustrated in the drawings corresponds to a depth direction of an element. A side that is close to an ABS (a surface of a thin magnetic head facing a recording medium) in the Y-direction may be referred to as "front-side," and an opposite side with respect to the front-side may be referred to as "rearward (depth side)."

A Z-direction illustrated in the drawings corresponds to a direction where lamination films are layered to configure the element, which is a so-called thickness direction. The direction in which the lamination films are layered may be referred to as "upward" or "upper side," and an opposite direction may be referred to as "downward" or "down side."

Prior to a description of a configuration of a main part of the present invention, an entire configuration of a microwave assisted magnetic head (the thin film magnetic head) of the present invention will be explained.

(Description of Entire Configuration of Microwave Assisted Magnetic Head (Thin Film Magnetic Head))

FIG. 1 illustrates a cross section (a cross section of Y-Z surface) of the thin film magnetic head parallel to the ABS.

A thin film magnetic head 100 illustrated in FIG. 1 is mounted to a magnetic recording device such as, for example, a hard disk drive and is utilized to perform a magnetic process on a magnetic recording medium 10, such as a hard disk, that moves toward a medium traveling direction M.

The thin film magnetic head 100 illustrated in the drawing as an example is a so-called composite-type head, which performs both a recording process and a reproducing process as the magnetic process. As illustrated in FIG. 1, the thin film magnetic head 100 is configured with a structure where a magnetic head part 101 having both of the above-described process functions is formed above a slider substrate 1 made of a ceramic material such as, for example, AlTiC ($Al_2O_3$TiC) through an insulation layer 2 such as alumina.

The magnetic head part 101 is configured with a reproducing head part 100A and a recording head part 100B, and the reproducing head part 100A and the recording head part 100B are layered in the Z-direction in this order. The reproducing head part 100A performs, for example, the reproduction of recorded magnetic information using a magneto-resistive (MR) effect. The recording head part 100B performs, for example, the recording process of a perpendicular recording system.

Hereafter, further detailed description will be given.

In the reproducing head part 100A, a first shield layer 3 and a second shield layer 5 are planar layers, which are respectively formed to be approximately parallel to an upper side surface of the slider substrate 1. The first and second shield layers 3 and 5 respectively form a part of the ABS 70.

A magnetoresistive effect (MR) element 8 is sandwiched between the first shield layer 3 and the second shield layer 5, and forms a part of the ABS 70 facing the surface of the medium.

The first shield layer 3 and the second shield layer 5 are formed by, for example, a frame plating method, a pattern plating method, and the like.

The MR element 8 is a lamination film formed by laminating preferred materials in the Z-direction as well as, for example, forming a TMR element or a GMR element, and forms a part of the ABS 70 facing the surface of the medium.

It is desired that the MR element 8 is a lamination film of a current perpendicular to plane (CPP) type that applies a sense current in a direction perpendicular to a lamination surface thereof.

Generally, the first shield layer 3 and the second shield layer 5 are designed to function as electrodes. As illustrated in FIG. 1, an electric circuit 7 for applying reader bias (which means the same as applying the sense current) is incorporated in the first shield layer 3 and the second shield layer 5. As a result, the sense current flows in the direction perpendicular to the lamination surface of the MR element 8.

Although not illustrated in the drawings, an interelement shield layer that is made of the same material as the second shield layer 5 can be further disposed between the second shield layer 5 and the recording head part 100B. This is to prevent an exogenous noise during reading by blocking the magnetic field generated from the recording head part 100B.

A bucking coil part (not illustrated) may be formed between the interelement shield layer formed as a preferred embodiment and the recording head part 100B. The bucking coil part generates a magnetic flux that negates a magnetic flux loop that is generated from the recording head part 100B and that passes through the magnetic pole layers (usually, the first and second shield layers 3 and 5) on and under the MR element 8. The bucking coil part suppresses unnecessary writing to the magnetic disk and a wide area adjacent track erasure (WATE) phenomenon, which is an erasing operation.

An insulation layer 4 made of alumina or the like is formed between the first shield layer 3 and the second shield layer 5, on the side of the MR element 8 opposite to the ABS 70. Although not illustrated in the drawings, a rearward portion, which is on the opposite side from the ABS 70 of the first and second shield layers 3 and 5, is formed with an insulation layer of alumina or the like.

The recording head part 100B is configured for a perpendicular magnetic recording.

As illustrated in FIGS. 1 and 2, the recording head part 100B is configured as a microwave assisted magnetic head with a main pole magnetic layer 16 including a main pole 15, a shielded magnetic layer 26 including a shielded pole 25, recording coils 23 that generates a recording magnetic field from a tip of the main pole 15, a microwave radiation waveguide 18 that is inserted in a recording gap, which is a gap between the main pole 15 and the shielded pole 25.

As illustrated in FIG. 1, a writing circuit 27 for generating signals from a write driver to the recording coils 23 is formed so as to generate the recording magnetic field from the tip of the main pole 15 by applying a writing current to the recording coils 23.

The main pole magnetic layer 16 including the main pole 15 is configured as a magnetic guide for guiding a magnetic flux induced by a layer of the recording coils 23 to the recording layer of the magnetic recording medium 10, which is to be written, as the magnetic flux is being focused. Herein, the main pole 15 is a portion of the main pole magnetic layer 16 that is in the vicinity of the ABS. At the edge part on the side of the ABS 70, the main pole 15 has, compared with the other portion, an extremely small width in the track width direction (a direction along the X-direction in FIG. 1) and an extremely small thickness in a lamination direction (a direction along the Z-direction of FIG. 1). As a result, the main pole 15 generates a minute and strong writing magnetic field that corresponds to the high recording density.

As illustrated in FIGS. 1 and 2, the microwave radiation waveguide 18 is disposed at the position of the recording gap, which is the gap between the main pole 15 and the shielded pole 25. Due to the intervening microwave radiation waveguide 18, the main pole 15 and the shielded pole 25 are electrically connected, Furthermore, these are also magnetically connected. This configuration is a connecting configuration, which is not seen in the conventional device. By adopting such a configuration, a manufacturing process will be extremely simplified and easy.

Figure 17:
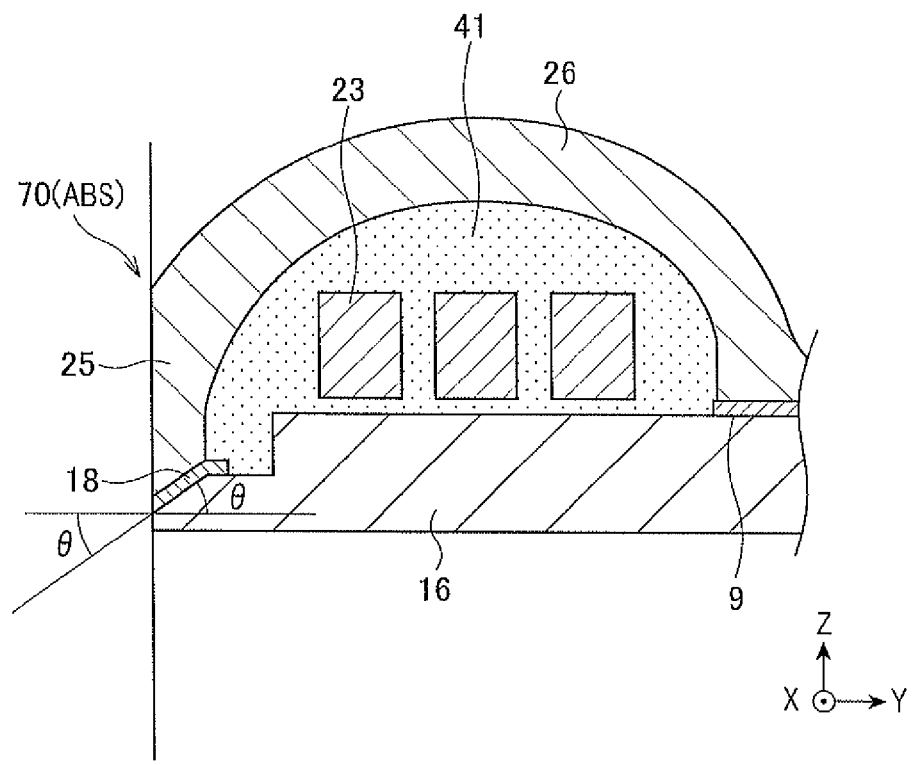
FIG. 17 corresponds to FIG. 1 and is a partially enlarged view clearly illustrating especially a state where the microwave radiation waveguide 18 is disposed in the recording gap between the main pole 15 and the shielded pole 25.

When seen from the Y-Z vertical cross sectional surface as illustrated in the partially enlarged view of FIG. 17, it is desired that the recording gap, which is the gap between the main pole 15 and the shielded pole 25, has an inclined part where an inclining angle θ is 20-40° toward the depth-side from the ABS with respect to the Y-direction that is a depth direction. The microwave radiation waveguide 18 is disposed along the inclined recording gap. Therefore, the microwave radiation waveguide 18 also has an inclined part where the inclining angle θ is 20-40°. With the taper recording gap, a magnetic field intensity and/or a magnetic field gradient are improved.

Figure 18:
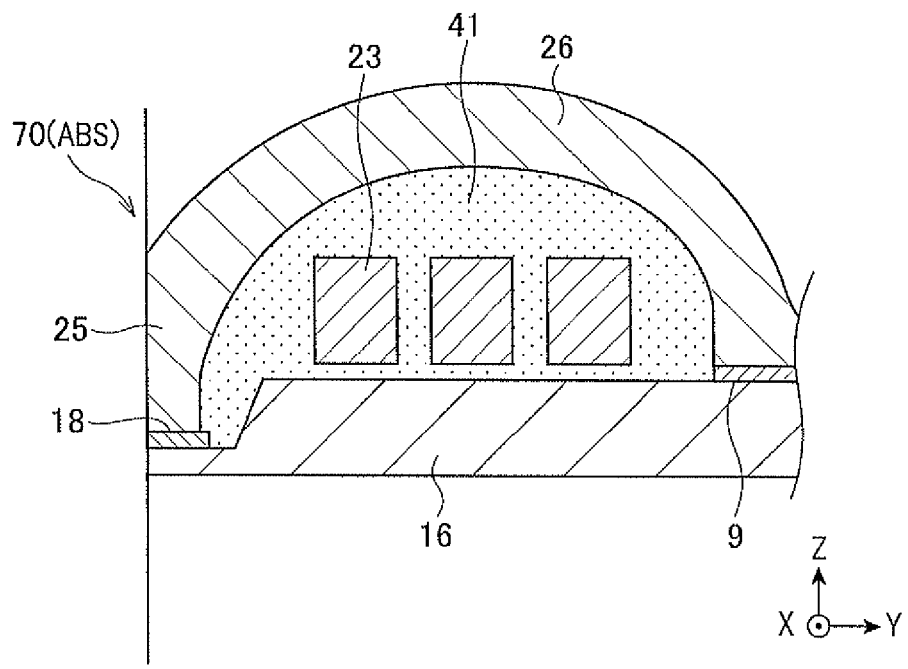
FIG. 18 corresponds to FIG. 1 and is a partially enlarged view clearly illustrating especially a state where the microwave radiation waveguide 18 is disposed in the recording gap between the main pole 15 and the shielded pole 25.

As illustrated in FIG. 18, even when the inclined angle θ is zero and the microwave radiation waveguide 18 has no inclined part, the objectives of the present invention are sufficiently achieved. The objectives are "to provide a microwave assisted magnetic head that has a novel configuration, having a simple configuration, with a relatively easy and efficient manufacturing process, and that overlaps AC magnetic fields in an in-plane direction of a microwave band, which is the same as, or close to, ferromagnetic resonant frequency of a medium recording layer."

The microwave radiation waveguide 18 is desirably made of Ru, Ti or Ta. The waveguide 18 is formed by, for example, a sputtering method, CVD method or the like. A detailed embodiment will be described below.

As illustrated in FIG. 1, the main pole magnetic layer 16 and a shielded magnetic layer 26 have an intermediate connection part G at the depth-side (the Y-direction). At the intermediate connection part G, an electrical insulation magnetic film 9 is disposed that connects the main pole magnetic layer 16 with the shielded magnetic layer 26.

The electrical insulation magnetic film 9 provides that members connecting via the film 9 are magnetically connected, but are not electrically connected because of electrical insulation. Therefore, a magnetic path is formed with the main pole magnetic layer 16 and the shielded magnetic layer 26 through the electrical insulation magnetic film 9, but the electric circuit is not formed with the main pole magnetic layer 16 and the shielded magnetic layer 26 through the electrical insulation magnetic film 9. However, there is no problem about the electric circuit not being formed through the electrical insulation magnetic film 9. Therefore, a microwave oscillator 17 is connected from the outside to the electric circuit that does not go through the electrical insulation magnetic film 9 and that is formed with the main pole magnetic layer 16, the microwave radiation waveguide 18, and the shielded magnetic layer 26.

By applying a microwave exciting current from the connected microwave oscillator 17, a microwave band resonant magnetic field having the ferromagnetic resonant frequency of the magnetic recording medium that is subjected to recording or having an adjacent frequency thereof is radiated from the microwave radiation waveguide 18. The outside microwave oscillator 17 is a device that provides a known microwave oscillator that oscillates a band of tens of GHz or more, which is different from a frequency used for recording and reproducing data. The microwave oscillator is configured to provide an IC or a microwave oscillation element supplying the microwave exciting current.

The electrical insulation magnetic film 9 is desirably made of a magnetic material having an electrical insulation characteristic such as a ferromagnetic oxide such as, for example, ferrite. A direction to apply the microwave exciting current at the ABS is the lamination direction of the main pole 15, the microwave radiation waveguide 18 and the shielded pole 25 (the Z-direction).

The shielded pole 25, which is at the edge part on the side of the ABS 70 where the shielded magnetic layer 26 is magnetically connected to the main pole magnetic layer 16, forms a so-called trailing shield part where a cross section of the layer is larger than other parts of the shielded magnetic layer 26. By disposing such a shielded pole 25, a magnetic gradient between the shielded pole 25 and the main pole 15 of the vicinity of the ABS 70 can be designed to be steep. As a result, jitter of a signal output becomes small and an error rate during reading becomes small.

The shielded magnetic layer 26 is formed having a width of approximately 0.5-5 μm using, for example, the frame plating method, the sputtering method, or the like. As a material for the layer, an alloy configured of two or three elements, for example, Ni, Fe, and Co, may be available. Or another alloy may also be available, which is configured of the element(s) as primary material and to which a predefined element is added.

Reference numbers 41 and 44 in FIG. 1 indicate insulation layers.

For the embodiment of FIG. 1, the recording coils 23 are designed to be wound around the main pole magnetic layer 16. However, a general embodiment where the recording coils 23 are wound around the intermediate connection part G as a center of a winding axis in the Y-direction is also applicable.

(Description of Feature of Present Invention)

Hereafter, a feature of the present invention will be described.

The feature of the present invention is that the microwave band resonant magnetic field having the ferromagnetic resonant frequency of the magnetic recording medium that is subjected to recording or having the adjacent frequency thereof is radiated from the microwave radiation waveguide 18 by interposing the microwave radiation waveguide 18 made of a conductive nonmagnetic material (a nonmagnetic metal) at the recording gap, which is the gap between the main pole 15 and the shielded pole 25, and by applying the microwave exciting current to the electric circuit formed by the main pole magnetic layer 16, the microwave radiation waveguide 18, and the shielded magnetic layer 26.

In order to configure the electric circuit for applying the microwave exciting current with the main pole magnetic layer 16, the microwave radiation waveguide 18 and the shielded magnetic layer 26, the electrical insulation magnetic film 9 is disposed in the intermediate connection part G that connects the main pole magnetic layer and the shielded magnetic layer at the depth-side.

In the present invention, the conductive nonmagnetic material is mounted in a so-called write gap so as to function as the microwave radiation waveguide 18, and the current flows in a direction perpendicular to a film surface of the waveguide 18 (CPP configuration). With a type where a coil is inserted to a known write gap, current flows directly to the coil and the current is not applied to the coil via a magnetic pole.

Since a frequency of the current in the present invention is a desired high frequency, an external frequency modulator is required to change the current therefor. When magnetic recording data is recorded, the high frequency current is applied to the magnetic pole to generate a data magnetic field from the magnetic pole.

Hereafter, concrete materials, embodiments, etc. of the microwave radiation waveguide 18 will be explained.

As described above, the microwave radiation waveguide 18 is desirably configured of Ru, Ti or Ta. The most preferred one of these is Ru. It is because a material of the magnetic pole and the microwave radiation waveguide (CPW part) is easily distinguished and sizes are easily measured when a shape is checked by SEM, etc. With Ti or Ta, it becomes difficult to distinguish the magnetic pole part and the CPW part and to measure the size.

The microwave radiation waveguide 18 is desired to adopt preferable embodiments, which will be described below, in order to electronically connect the main pole 15 with the shielded pole 25 and to radiate properly and effectively, from the microwave radiation waveguide 18, the microwave band resonant magnetic field having the ferromagnetic resonant frequency of the magnetic recording medium that is subjected to recording or having the adjacent frequency thereof.

First Embodiment

Figure 3A:
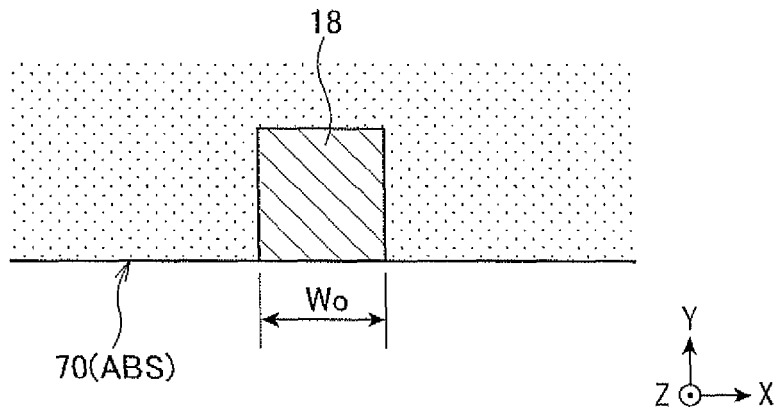
FIG. 3A illustrates one aspect of a planar shape (X-Y surface (additionally, when a waveguide has an inclined surface, the plane is along an incline thereof)) of the microwave radiation waveguide positioned in a recording gap that is between a main pole and a shielded pole.

FIGS. 2 and 3A illustrate the first embodiment.

A microwave radiation waveguide 18 of the first embodiment illustrated in FIGS. 2 and 3A has a width Wo in the X-direction of the ABS, and the width is the same as a length of a side of an edge part 15a of the main pole 15 on a trailing side.

The microwave radiation waveguide 18 is extended toward the depth-side (the Y-direction) maintaining the width Wo in the X-direction, and is configured in approximately a square shape as illustrated in FIG. 3A when seen in a planar shape. A thickness (the Z-direction) is a thickness so that all of the recording gap is filled.

The microwave radiation waveguide 18 having the approximately square shape when seen in the planar shape has the advantage that manufacturing processes are relatively simplified.

Second Embodiment

Figure 3B:
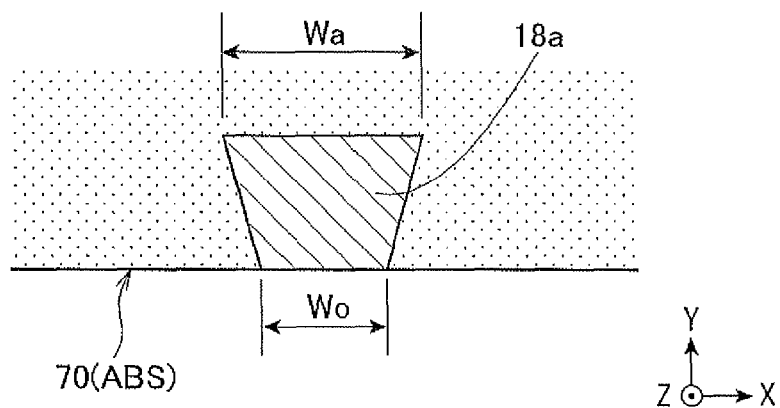
FIG. 3B illustrates one aspect of the planar shape (X-Y surface (additionally, when a waveguide has the inclined surface, the plane is along the incline)) of the microwave radiation waveguide positioned in the recording gap that is between the main pole and the shielded pole.

FIG. 3B illustrates the second embodiment.

Regarding a microwave radiation waveguide 18a of the second embodiment illustrated in FIG. 3B, a view thereof seen from the ABS is the same as the embodiment illustrated in FIG. 2. In other words, a width Wo in the X-direction on the ABS is the same as the length of the side of the edge part 15a on the trailing side of the main pole 15. The width Wo becomes wider up to a width Wa approaching the depth-side (the Y-direction) as illustrated in FIG. 3B. As a result, the waveguide 18a is configured in an approximately trapezoidal shape where the width of the depth-side is widened when seen in the planar shape. A thickness (the Z-direction) is a thickness so that that all of the recording gap is filled.

The microwave radiation waveguide 18a having the approximately trapezoidal shape when seen in the planar shape has an advantage where the intensity of the microwave magnetic field from the ABS is raised.

A ratio of Wa/Wo is desirably approximately 1.5-3.0.

Third Embodiment

Figure 3C:
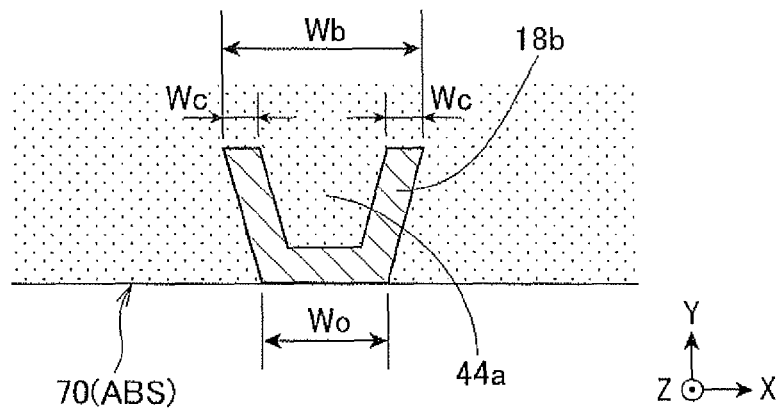
FIG. 3C illustrates one aspect of the planar shape (X-Y surface (additionally, when the waveguide has the inclined surface, the plane is along the incline)) of the microwave radiation waveguide positioned in the recording gap that is between the main pole and the shielded pole.

FIG. 3C illustrates the third embodiment.

Regarding a microwave radiation waveguide 18b of the third embodiment illustrated in FIG. 3C, a view thereof seen from the ABS is the same as the embodiment illustrated in FIG. 2. In other words, the width Wo in the X-direction on the ABS is the same as the length of the side of the edge part 15a on the trailing side of the main pole 15. The width Wo is widened approaching the depth-side (the Y-direction). The waveguide 18b branches into two waveguide parts (a width Wc) elongating toward the depth-side and outwards (namely, in the X-direction), and it is configured approximately in a V-shape when seen in the planar shape.

A thickness (the Z-direction) is a thickness so that all of the recording gap is filled. An inside of the approximate V-shape is filled with a nonmagnetic material 44a.

The microwave radiation waveguide 18b as seen in the planar shape configured approximately in a square shape has an advantage where the intensity of the microwave magnetic field from the ABS is further raised.

A ratio of Wb/Wo is approximately 2.0-5.0. A ratio of Wc/Wo is approximately 0.5-1.5.

Fourth Embodiment

Figure 4:
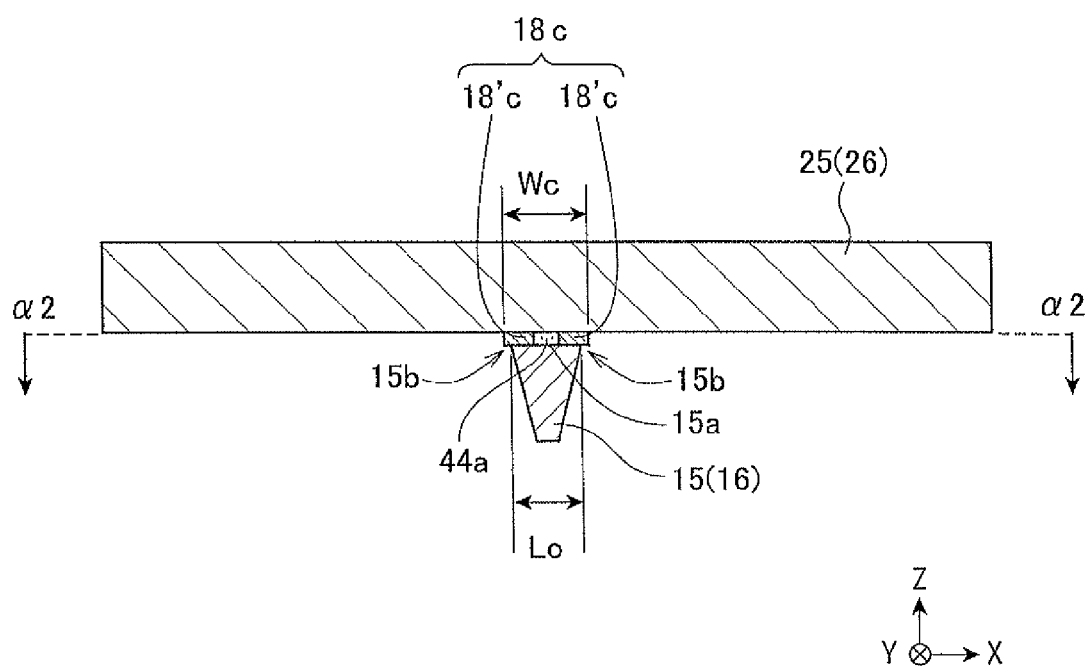
FIG. 4 is a view of the ABS of the microwave radiation waveguide positioned in the recording gap that is between the main pole and the shielded pole.
Figure 5A:
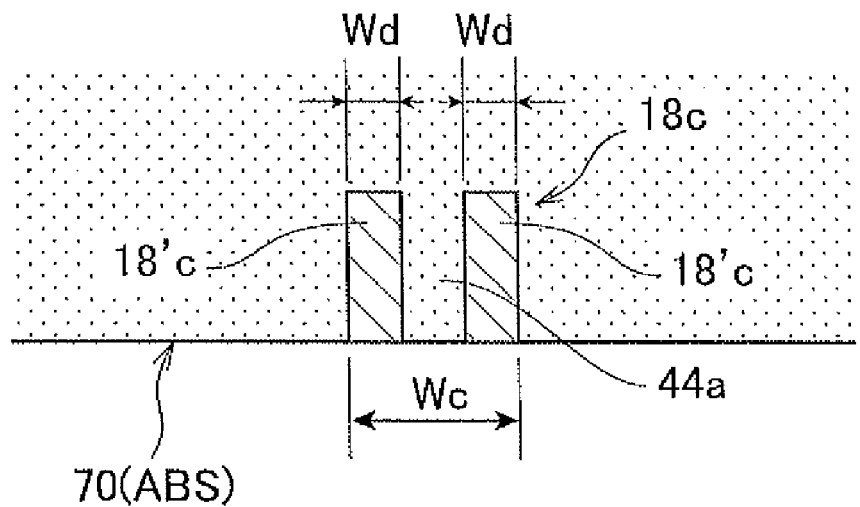
FIG. 5A illustrates one aspect of the planar shape (X-Y surface) of the microwave radiation waveguide positioned in the recording gap that is between the main pole and the shielded pole.

FIGS. 4 and 5A illustrate the fourth embodiment.

A microwave radiation waveguide 18e of the fourth embodiment illustrated in FIGS. 4 and 5A has two cuboid waveguides 18'c and 18'c, which are arranged to cover both end edges 15b and 15b of the edge part 15a on the trailing side of the main pole 15.

A maximum arrangement width We of the waveguide 18c is approximately 1.0-1.5 of a ratio of We/Lo related to a length Lo of the side of the edge part 15a on the trailing side of the main pole 15. Width Wd between each of the waveguides 18'c and 18'c is set to be Wd/Lo=approximately 0.2-0.5 with respect to Lo. In a gap between the two waveguides 18'c and 8'c, the nonmagnetic material 44a is filled.

Such a microwave radiation waveguide 18c effectively makes up for a deterioration of a main pole magnetic field especially on the track edge part. As a result, a magnetic field that is uniformly stable in the track width direction is obtained, a deterioration of a recording quality on the track edge part is prevented, and the stable recording pattern is recorded on the medium.

Fifth Embodiment

Figure 5B:
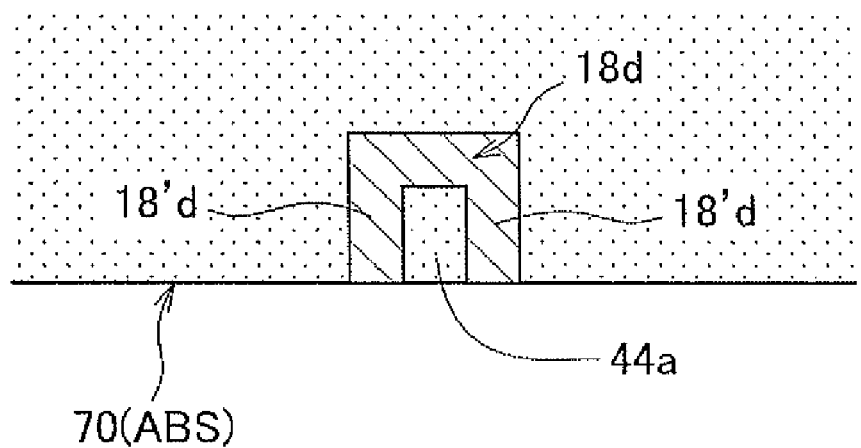
FIG. 5B illustrates one aspect of the planar shape (X-Y surface (additionally, when the waveguide has the inclined surface, the plane is along the incline)) of the microwave radiation waveguide positioned in the recording gap that is between the main pole and the shielded pole.

FIG. 5B illustrates the fifth embodiment.

Regarding a microwave radiation waveguide 18d of the fifth embodiment illustrated in FIG. 5B, a view thereof seen from the ABS is the same as the fourth embodiment illustrated in FIG. 4.

The difference of the microwave radiation waveguide 18d illustrated in FIG. 5B from the fourth embodiment illustrated in FIG. 5A is that waveguides 18'd and 18'd are linked at the rear side part of the depth-side (the Y-direction) so as to be approximately in a U-shape. The waveguides 18'd and 18'd are two cuboids arranged to correspond to (or to cover) both end edges 15b and 15b of the edge part 15a on the trailing side of the main pole 15 at the ABS.

The thickness (in the Z-direction) is sufficient to fill the recording gap. The nonmagnetic material 44a is present inside of the U-shape.

The microwave radiation waveguide 18d especially effectively makes up for a deterioration of the main pole magnetic field at the track edge part, the same as the above-described fourth embodiment. As a result, a uniformly stable magnetic field in the track width direction is obtained, a deterioration of recording quality at the track edge part is prevented, and a stable recording pattern is recorded on the medium.

Sixth Embodiment

Figure 6:
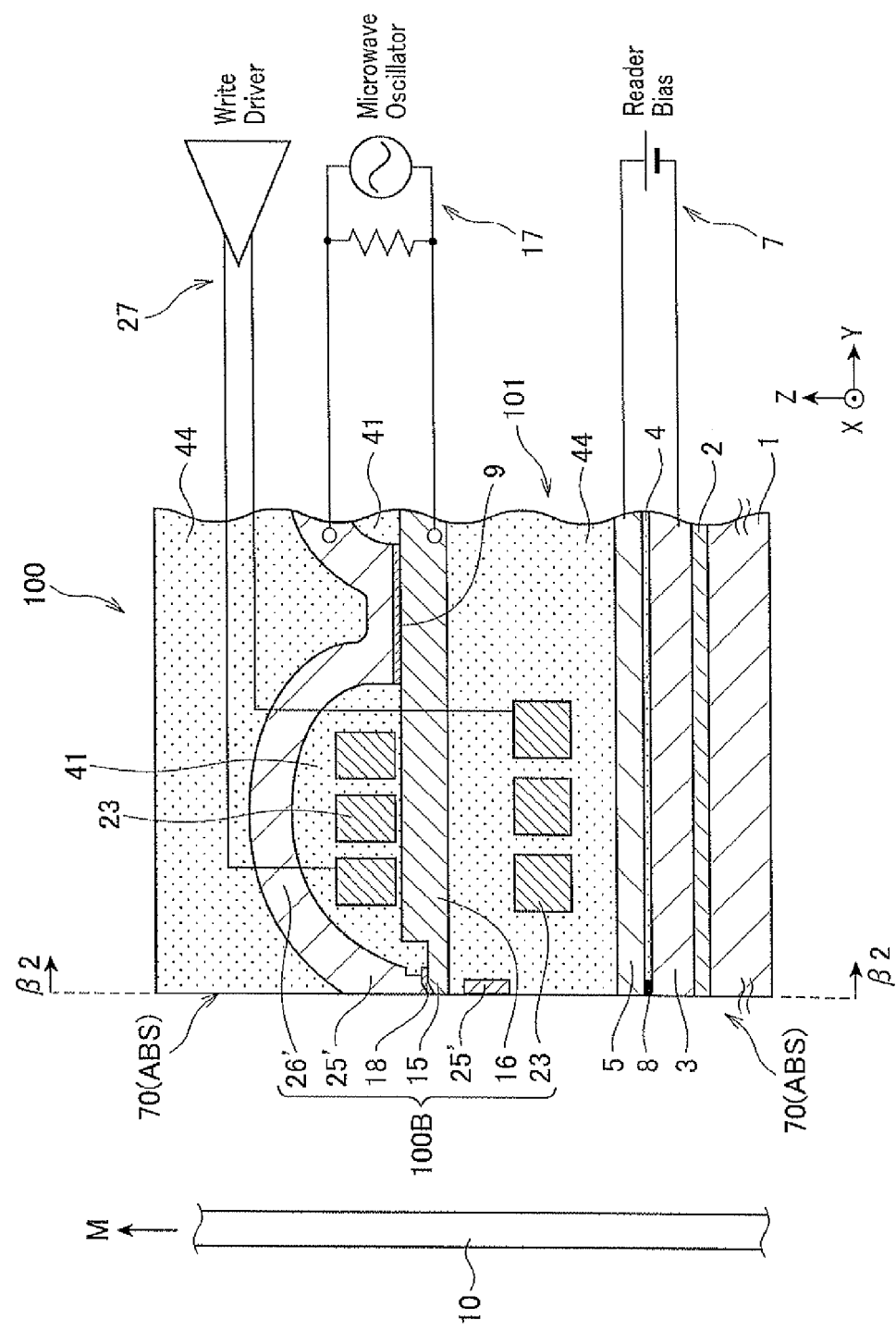
FIG. 6 illustrates a configuration of a microwave assisted magnetic head (a thin film magnetic head of a wrap-around shield type) according to one preferable embodiment of the present invention.

FIGS. 6 and 7 illustrate the sixth embodiment.

A microwave radiation waveguide 18 of the sixth embodiment illustrated in FIGS. 6 and 7 is basically configured the same as the embodiments illustrated in FIGS. 2 and 3A, the embodiment illustrated in FIG. 3B, and/or the embodiment illustrated in FIG. 3C.

In the sixth embodiment illustrated in FIGS. 6 and 7, a structure of a shielded magnetic layer is especially different. A shielded magnetic layer 26' of the sixth embodiment illustrated in FIGS. 6 and 7 is configured for a magnetic head of a so-called wrap-around shield type. When seen from the ABS that is a surface facing the magnetic recording medium, the shielded magnetic layer 26' is configured as a comprehensive shielded pole 25' that is formed so as to surround an approximately whole part of the main pole 15 via a nonmagnetic part 44b that is partially formed in the periphery of the main pole 15 (wrap-around shield).

In FIG. 7, as seen from the ABS; the main pole 15 and the shielded pole 25' are electrically connected via the microwave radiation waveguide 18. The shielded pole 25' and the other part of the periphery part of the main pole 15 is insulated by the nonmagnetic part 44b.

Such a microwave radiation waveguide 18 has an advantage in an assisted magnetic field having a better quality for suppressing a leaking of a magnetic field to an adjacent track.

When seen from the ABS that is a surface facing the magnetic recording medium, the shielded magnetic layer 26 of the embodiment illustrated in FIGS. 2 and 3A has a magnetic head structure providing only the shielded pole 25 positioned facing the main pole 15 in the Z-direction. This is referred to as a non-wrap-around shield type.

Seventh Embodiment

Figure 8A:
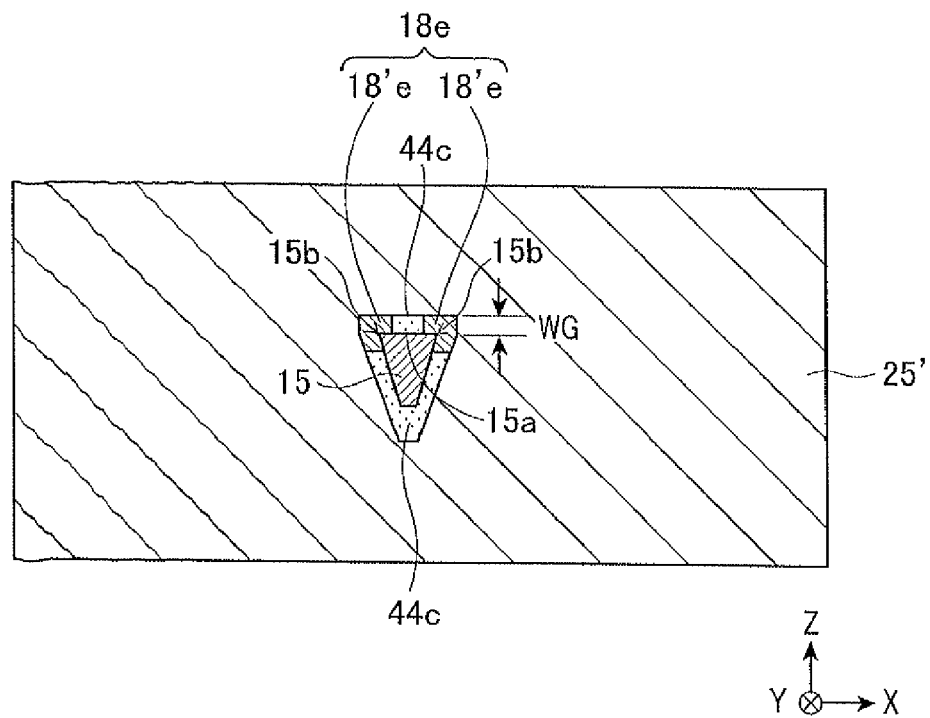
FIG. 8A is a view seen from the arrow β2-β2 of FIG. 6.

FIG. 8A illustrates the seventh embodiment.

The seventh embodiment illustrated in FIG. 8A is a magnetic head of the wrap-around shield type the same as the sixth embodiment.

A microwave radiation waveguide 18e of the seventh embodiment is configured having two L-shaped waveguides 18'e and 18'e positioned so as to surround corners of both of the end edges 15b and 15b of an edge part 15a on the trailing side of the main pole 15.

The main pole 15 and the shielded pole 25' are electrically connected via the microwave radiation waveguide 18e, and the other part of the periphery part of the main pole 15 is insulated by a nonmagnetic part 44c.

A part substantially effective as the microwave radiation waveguide 18e in the seventh embodiment is areas illustrated as WG in the figures.

Eighth Embodiment

Figure 8B:
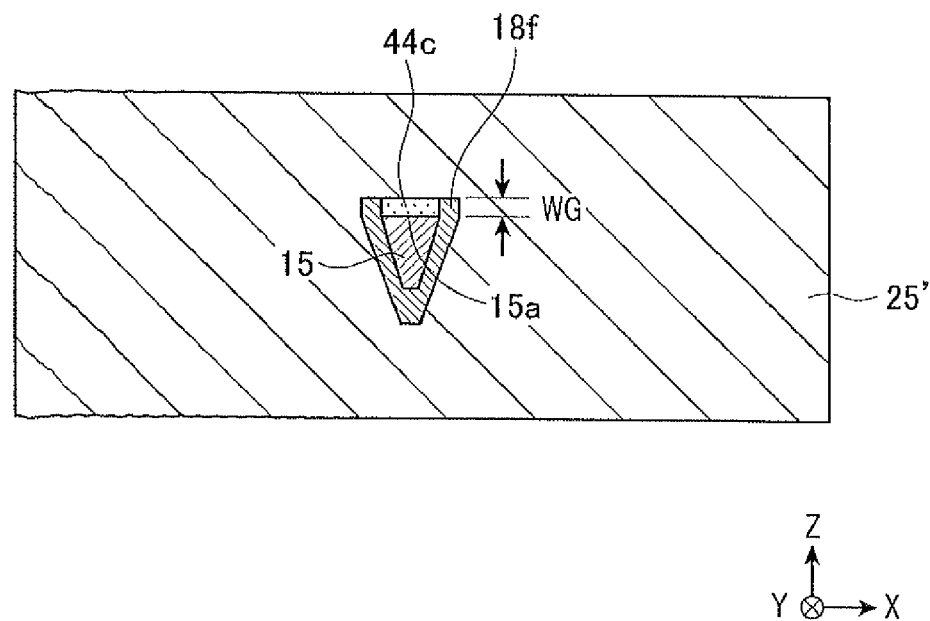
FIG. 8B is a view seen from the arrow β2-β2 of FIG. 6.

FIG. 8B illustrates the eighth embodiment.

The eighth embodiment illustrated in FIG. 8B is a magnetic head of the wrap-around shield type the same as the above-described sixth and seventh embodiments.

Regarding a microwave radiation waveguide 18f of the eighth embodiment, a part of the edge part 15a on the trailing side of the main pole 15 at the ABS illustrated in FIG. 8B is covered with a nonmagnetic part 44c, and the other part of the periphery of the main pole 15 is covered with the microwave radiation waveguide 18f in a V-shape.

Such an embodiment is also deemed as an embodiment where a microwave radiation waveguide made of a conductive nonmagnetic material (nonmagnetic metal) is disposed in the recording gap that is a gap between the main pole and the shielded pole of the present invention. This is because a part substantially effective as the microwave radiation waveguide 18f in the eighth embodiment becomes an area illustrated as WG in the figure.

(Description of Head Gimbal Assembly and Hard Disk Device)

Next, an example of a head gimbal assembly and a hard disk device in which the above-described microwave assisted magnetic head is installed is described.

Figure 9:
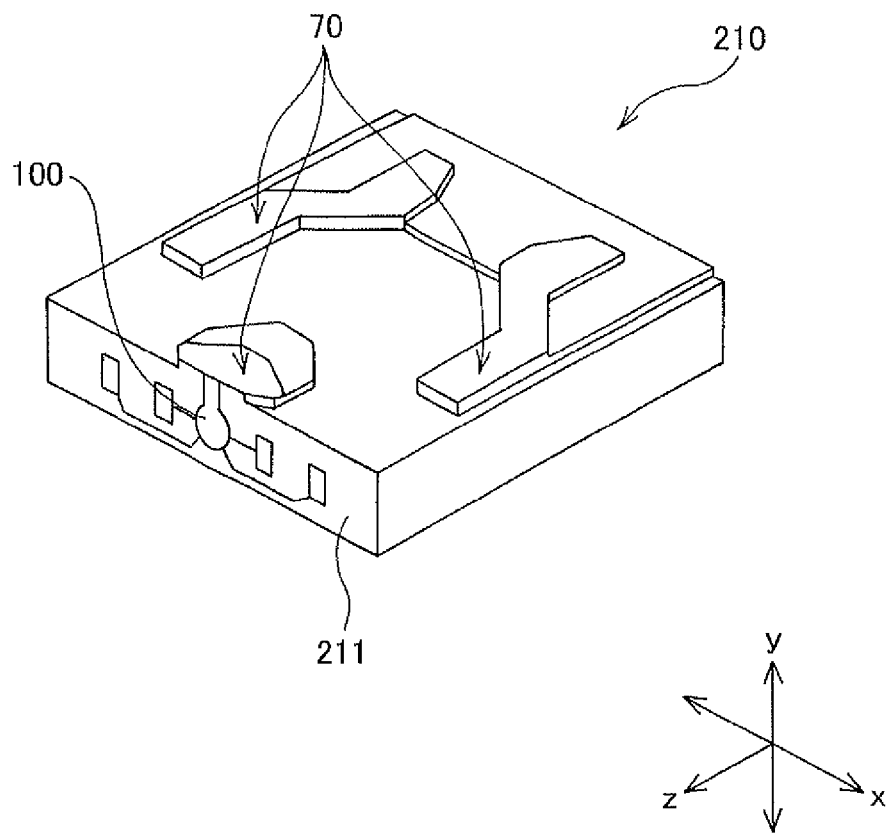
FIG. 9 is a perspective view illustrating a slider included in a head gimbal assembly according to one preferable embodiment of the present invention.

First, with reference to FIG. 9, a slider 210 included in the head gimbal assembly is described. In a hard disk device, the slider 210 is positioned to face a hard disk, which is a rotated disk-shaped recording medium. The slider 210 primarily includes a base 211 configured from a substrate and an overcoat.

The base 211 has a hexahedronal shape. One of the six sides of the base 211 faces the hard disk. The ABS 70 is formed on this side.

As the hard disk rotates in the Z-direction in FIG. 9, a lift force is generated for the slider 210 in the downward direction in the Y-direction shown in FIG. 9 due to an air flow passing between the hard disk and the slider 210. The slider 210 flies on the surface of the hard disk due to the lift force. The X-direction in FIG. 9 is a track crossing direction of the hard disk.

A thin film magnetic head according to the present embodiment is formed near an air outflow-side edge (left lower edge in FIG. 9) of the slider 210.

Next, a head gimbal assembly 220 according to the present embodiment is described with reference to FIG. 10. The head gimbal assembly 220 includes the slider 210 and a suspension 221 that elastically supports the slider 210. The suspension 221 includes a plain spring load beam 222 formed from, for example, stainless steel, a flexure 223 that is provided at one edge of the load beam 222 and connected to the slider 210 and that provides a proper degree of freedom to the slider 210, and a base plate 224 provided at the other edge of the load beam 222.

The base plate 224 is mounted to an arm 252 of an actuator for moving the slider 210 in the track crossing direction x of the hard disk 262. The actuator has the arm 252 and a voice coil motor that drives the arm 252. A gimbal part for maintaining the position of the slider 210 constant is provided at a part of the flexure 223, to which the slider 210 is mounted.

The head gimbal assembly 220 is mounted at the arm 252 of the actuator. An assembly, in which the head gimbal assembly 220 is mounted to a single arm 252, is referred to as a head arm assembly. An assembly, in which the head gimbal assembly 220 is mounted to each arm of a carriage having multiple arms, is referred to as a head stack assembly.

Figure 10:
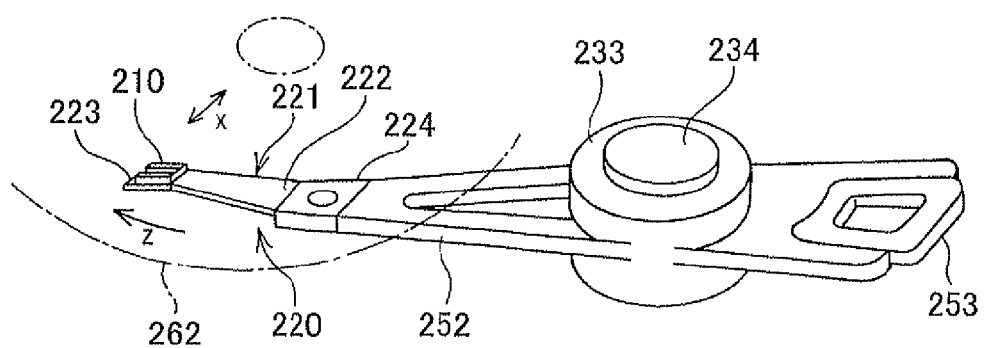
FIG. 10 is a perspective view of a head arm assembly including the head gimbal assembly according to one preferable embodiment of the present invention.

FIG. 10 illustrates an example of a head arm assembly. In the head arm assembly, the head gimbal assembly 220 is mounted to one end of the aim 252. To the other end of the arm 252, a coil 253, which is a part of the voice coil motor, is mounted. In the middle part of the arm 252, a bearing part 233 that is mounted to a shaft 234 so that the arm 252 is rotatably supported.

Next, an example of a head stack assembly and a hard disk device according to the embodiment are described with reference to FIGS. 11 and 12.

Figure 11:
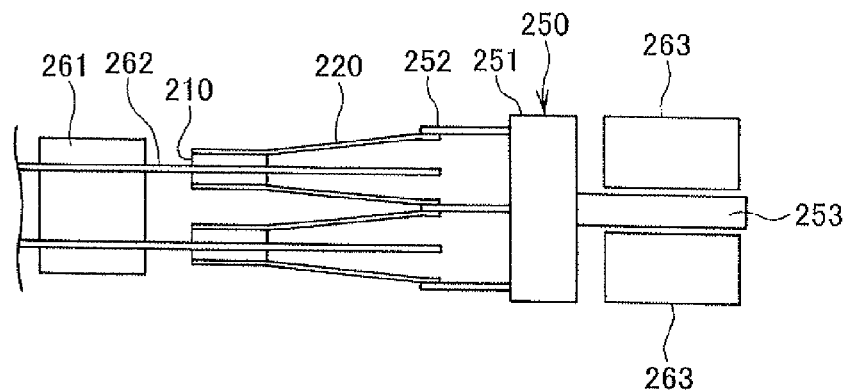
FIG. 11 is an explanatory view illustrating a main part of a magnetic disk device of one preferable embodiment of the present invention.
Figure 12:
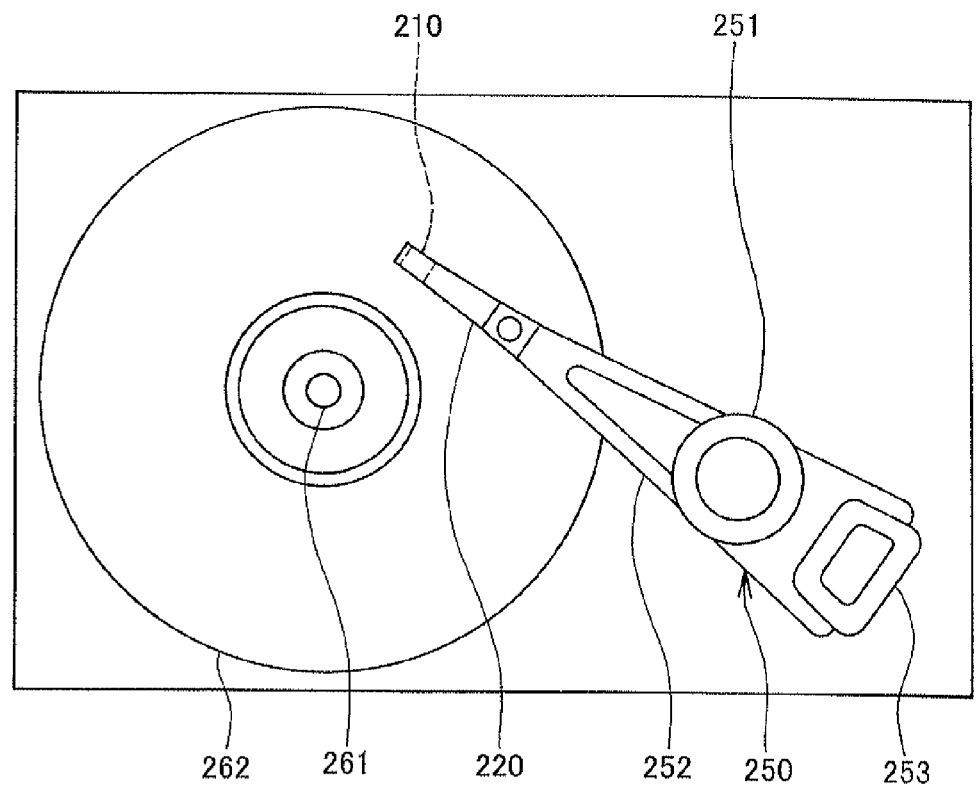
FIG. 12 is a plan view of the magnetic disk device of one preferable embodiment of the present invention.

FIG. 11 is an explanatory view of a main part of the hard disk device, and FIG. 12 is a plan view of the hard disk device.

A head stack assembly 250 includes a carriage 251 including a plurality of arms 252. A plurality of head gimbal assemblies 220 are mounted respectively to the plurality of arms 252 such that the head gimbal assemblies 220 in the perpendicular direction have gaps between each other. The coil 253 that is part of the voice coil motor is mounted on the end of the carriage 251 opposite from the arm 252. The head stack assembly 250 is installed in the hard disk device.

The hard disk device has multiple hard disks 262 mounted to a spindle motor 261. At each hard disk 262, two sliders 210 are positioned facing each other and sandwiching the hard disk 262. The voice coil motor has permanent magnets 263 positioned facing each other and sandwiching the coil 253 of the head stack assembly 250.

The head stack assembly 250 and the actuator, excluding the slider 210, correspond to a positioning device in the present invention. The head stack assembly 250 and the actuator support and position the slider 210 with respect to the hard disk 262.

In the hard disk device according to the present embodiment, the actuator positions the slider 210 with respect to the hard disk 262 by moving the slider 210 in the track crossing direction of the hard disk 262. The thin film magnetic head included in the slider 210 records information on the hard disk 262 by a recording head and reproduces the information recorded on the hard disk 262 by a reproducing head.

The head gimbal assembly and the hard disk device according to this embodiment are as effective as the thin film magnetic head according to the above-described embodiment.

Moreover, in the embodiment, a thin film magnetic head with a structure, in which a reproducing head part is formed on the base substrate side and the perpendicular recording head part is laminated thereon, was discussed. However, the order of the lamination may be reversed. Further, when the thin film magnetic head is used exclusively for reproducing information, only a reproducing head part may be provided.

DETAILED EXAMPLES

Hereafter, detailed examples regarding the microwave assisted magnetic head of the present invention are described so that a further detailed explanation of the present invention will be given.

Example 1

Manufacturing of Samples of Example 1

A microwave assisted magnetic head (the present invention) of the wrap-around shield type, which provides a microwave for microwave radiation 18 as illustrated in FIGS. 6 and 7, was designed. An exemplary simulation of a wedge shaped magnetic field distribution, which was generated from the waveguide and was protruded in the −Y direction, was executed, and a characteristic value was obtained.

Settings of a main part configuring the head were as follows.

<The microwave Radiation Waveguide 18>
Material: Ru
Width (X-direction): 50 nm
Depth (Y-direction): 30 nm
Thickness (Z-direction): 30 nm
Inclined angle θ: 25°
<Main Pole 15>
Material: FeCo
<Shielded Pole 25' (Wrap-Around Shield Type)>
Material: NiFe
<Nonmagnetic Part 44b>
Material: Alumina ($Al_2O_3$)

Figure 13:
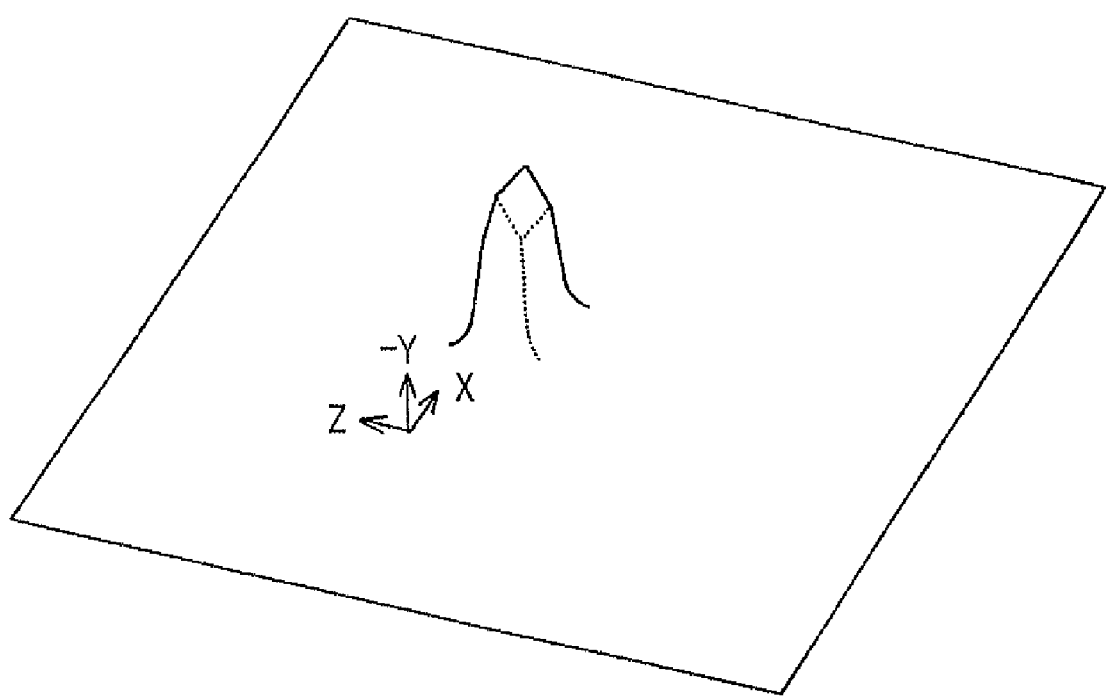
FIG. 13 illustrates a modeling state of a magnetic field distribution indicated as a protruded wedge shape in a −Y direction directed to the facing magnetic recording medium) when generated from the microwave radiation waveguide of a sample of an example.

A modeling state of a magnetic field distribution was illustrated in FIG. 13. The magnetic field forming the distribution was emitted from the waveguide 18 to which the microwave (frequency 20 GHz, output 10 mW) was applied, the microwave radiation waveguide 18 of the sample of example 1 providing the above-described setting. Also, the magnetic field distribution was illustrated as a wedge shape protruded in the −Y direction (directed to the facing magnetic recording medium).

According to the result illustrated in FIG. 13, a part closer to a tip of the wedge shape protruded in the −Y direction has a larger magnetic field intensity. Even when a small amount of power, 10 mW, was applied, the magnetic field intensity of approximately 800 [Oe] emerged at the tip-most part. When the power was increased, the magnetic field was increased in proportion to the power. Therefore, a required assisted magnetic field was arbitrarily adjusted together with power.

Figure 14:
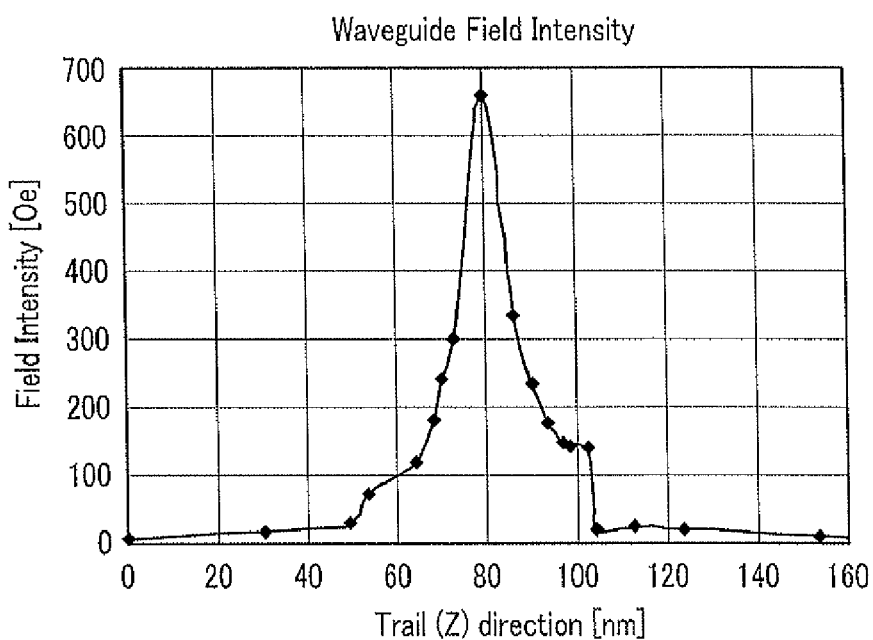
FIG. 14 is a graph illustrating a magnetic field distribution in a thickness direction (a Z-direction which is the same as a trail direction) of the microwave radiation waveguide of the sample of the example.
Figure 15:
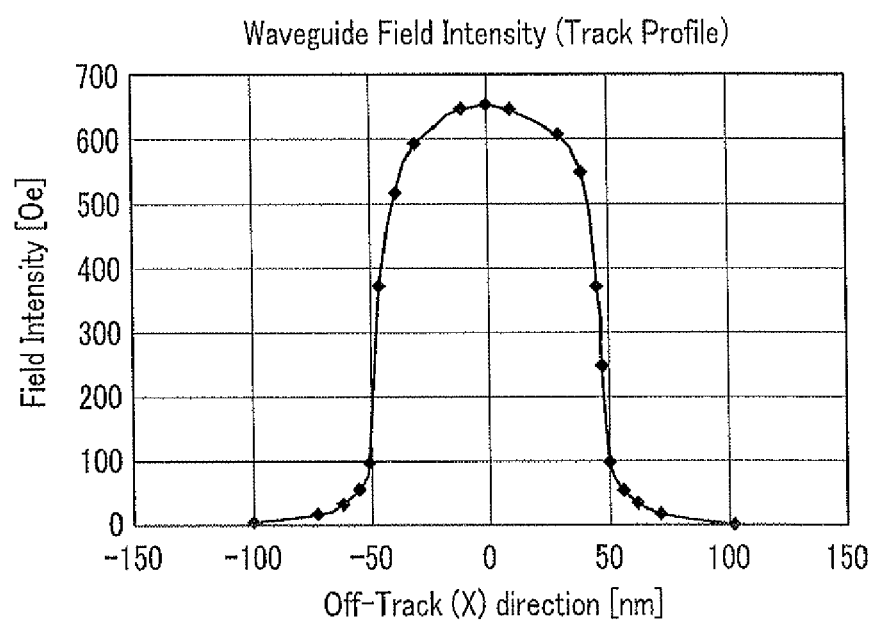
FIG. 15 is a graph illustrating a magnetic field distribution in a width direction (a X-direction which is the same as an off-track direction) of the microwave radiation waveguide of the sample of the example.

Furthermore, a magnetic field distribution of the thickness direction (the Z-direction: the same as the trail direction) and the width direction (the X-direction: the same as the off-track direction) of the waveguide 18 were obtained and illustrated in FIGS. 14 and 15.

As illustrated in FIG. 14, a steep magnetic field distribution was obtained in the Z-direction: the trail direction. As illustrated in FIG. 15, a magnetic field distribution having a track width of 100 nm in the X-direction: off track direction was obtained.

Then, it was simulated that the high-frequency assisted magnetic field generated from the microwave radiation waveguide 18 overlapped the normal head recording magnetic field and that the magnetic recording was executed.

Manufacturing of Samples of Example 2

A microwave assisted magnetic head of the shield type (the present invention) providing a microwave radiation waveguide 18 as illustrated in FIGS. 2 and 3 was designed. An exemplary simulation of a wedge shaped magnetic field distribution that was generated from the waveguide and was protruded in the −Y direction was executed, and a characteristic value was obtained.

Settings of a main part were almost the same as the sample of the above-described example 1.

Furthermore, a magnetic field distribution of the thickness direction (the Z-direction: the same as the trail direction) and the width direction (the X-direction: the same as the oil-track direction) of the waveguide 18 was obtained by the same procedure as the sample of example 1. Results of the sample of example 2 were the same as the results illustrated in FIGS. 14 and 15 for the sample of example 1.

Manufacturing of Samples of Example 3

In this sample, the microwave radiation waveguide is configured to be a structure as illustrated in FIG. 3C. Except for the waveguide, samples of the microwave assisted magnetic head (the present invention) for example 3 were configured the same as the sample of the above-described example 2, an exemplary simulation of a wedge shaped magnetic field distribution that was generated from the waveguide and was protruded in the −Y direction was executed, and a characteristic value was obtained.

Figure 16:
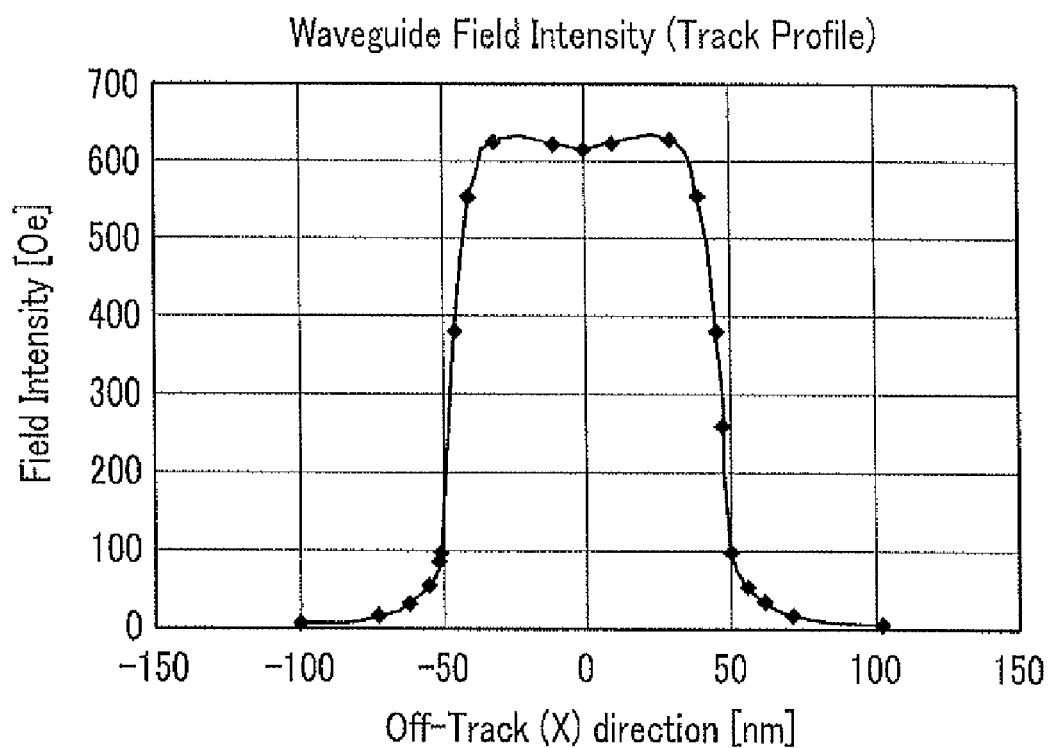
FIG. 16 is a graph illustrating a magnetic field distribution of the width direction (the X-direction which is the same as the off-track direction) of the microwave radiation waveguide of a sample of another example.

Then, with the same procedure as the sample of example 1, a magnetic field distribution of the thickness direction (the Z-direction: the same as the trail direction) and the width direction (the X-direction: the same as the off-track direction) of a part of the microwave radiation waveguide 18 was obtained. As a result, there was no change for the magnetic field distribution of the thickness direction (the Z-direction: the same as the trail direction) of the part of waveguide 18. On the other hand, as illustrated in FIG. 16, the magnetic field distribution of the width direction (the X-direction: the same as the off-track direction) was further flattened in a vicinity of a maximum value of the intensity distribution.

Therefore, it was confirmed that a magnetic field profile was controlled depending on the shapes in which the microwave radiation waveguide was set.

According to the above results, the advantages of the present invention are obvious.

Namely, a microwave assisted magnetic head of the present invention is formed to include a main pole magnetic layer including a main pole; a shielded magnetic layer including a shielded pole; a recording coil that is formed to generate a writing magnetic field from a tip of the main pole; and a microwave radiation waveguide made of a conductive nonmagnetic material that is disposed in a recording gap, the recording gap being a gap between the main pole and the shielded pole. The main pole magnetic layer and the shielded magnetic layer have an intermediate connection part that connects the layers at a depth-side, and an electrical insulation magnetic film is disposed in the intermediate connection part, and the main pole and the shielded pole are electrically connected with the microwave radiation waveguide that is disposed in the recording gap, which is the gap between the main pole and the shielded pole. Therefore, the present invention provides the microwave assisted magnetic head that has a novel configuration, having a simple configuration, a relatively easy manufacturing process, high efficiency, and that overlaps the AC magnetic field in an in-plane direction of the microwave band, which is the same as, or close to, the ferromagnetic resonant frequency of the medium recording layer.

What is claimed is:

1. A microwave assisted magnetic head, comprising:
  a main pole magnetic layer including a main pole;
  a shielded magnetic layer including a shielded pole;
  a recording coil that is formed to generate a writing magnetic field from a tip of the main pole; and
  a microwave radiation waveguide made of a conductive nonmagnetic material that is disposed in a recording gap, the recording gap being a gap between the main pole and the shielded pole, wherein
  the main pole magnetic layer and the shielded magnetic layer have an intermediate connection part that connects the layers at a depth-side, and an electrical insulation magnetic film is disposed in the intermediate connection part, and
  the main pole and the shielded pole are electrically connected with the microwave radiation waveguide that is disposed in the recording gap, which is the gap between the main pole and the shielded pole.

2. The microwave assisted magnetic head according to claim 1, wherein
  a microwave oscillator is connected to an electric circuit that is formed by the main pole magnetic layer, the microwave radiation waveguide, and the shielded magnetic layer, and
  the connected microwave oscillator is configured to radiate a microwave band resonant magnetic field having either a ferromagnetic resonant frequency or an adjacent frequency of a magnetic recording medium, which is subjected to recording, by applying a microwave exciting current.

3. The microwave assisted magnetic head according to claim 1, wherein
  a microwave oscillator is connected to an electric circuit that is formed by the main pole magnetic layer, the microwave radiation waveguide, and the shielded magnetic layer, and
  the connected microwave oscillator is configured to generate a current by applying a microwave exciting current, and to make the current flow in a direction perpendicular to a film surface of the waveguide.

4. The microwave assisted magnetic head according to claim 1, wherein
  the microwave radiation waveguide is made of Ru, Ti, or Ta.

5. The microwave assisted magnetic head according to claim 1, wherein the recording gap, which is the gap between the main pole and the shielded pole, is configured with a gap formed between an edge of the main pole at a trailing side and the shielded pole.

6. The microwave assisted magnetic head according to claim 1, wherein
the electrical insulation magnetic film is ferrite formed of ferromagnetic oxide.

7. The microwave assisted magnetic head according to claim 2, wherein
the microwave oscillator includes an integrated circuit (IC) or a microwave oscillation element supplying the microwave exciting current.

8. The microwave assisted magnetic head according to claim 1, wherein
the shielded magnetic layer is a non-wrap-around shield type with which only the shielded pole is provided, the shielded pole being positioned facing the main pole when seen from an air bearing surface (ABS), which is a surface facing the magnetic recording medium.

9. The microwave assisted magnetic head according to claim 1, wherein
the shielded magnetic layer is a wrap-around shield type that is formed as a comprehensive shielded pole surrounding the main pole via a partially formed nonmagnetic part when seen from the ABS, which is a surface facing the magnetic recording medium.

10. The microwave assisted magnetic head according to claim 1, wherein
the recording gap, which is the gap between the main pole and the shielded pole, includes an inclined part of which an inclining angle $\theta$ is 20-40° toward the depth-side from the ABS when seen in a vertical cross section, and
the microwave radiation waveguide is disposed along the inclined recording gap.

11. A head gimbal assembly, comprising:
a slider that includes the thin film magnetic head according to claim 1 and that is positioned facing a recording medium; and
a suspension that elastically supports the slider.

12. A magnetic disk device, comprising:
the slider that includes the thin film magnetic head according to claim 1 and that is positioned facing a recording medium; and
a positioning device that supports and positions the slider with respect to the recording device.

* * * * *